US010067349B2

(12) United States Patent
Chen

(10) Patent No.: US 10,067,349 B2
(45) Date of Patent: Sep. 4, 2018

(54) METHOD OF ADAPTING A VIRTUAL REALITY HELMET

(71) Applicant: Beijing Pico Technology Co., Ltd., Beijing (CN)

(72) Inventor: Xing yi Chen, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 8 days.

(21) Appl. No.: 15/221,790

(22) Filed: Jul. 28, 2016

(65) Prior Publication Data
US 2017/0192236 A1    Jul. 6, 2017

(30) Foreign Application Priority Data

Dec. 31, 2015 (CN) .......................... 2015 1 1032228

(51) Int. Cl.
*G09G 5/00* (2006.01)
*G02B 27/01* (2006.01)

(52) U.S. Cl.
CPC ....... *G02B 27/0172* (2013.01); *G02B 27/017* (2013.01); *G09G 5/006* (2013.01); *G02B 2027/011* (2013.01); *G02B 2027/014* (2013.01); *G02B 2027/0141* (2013.01)

(58) Field of Classification Search
CPC .............. G02B 27/017; G02B 27/0172; G02B 27/0179; G09G 5/006
See application file for complete search history.

(56) References Cited

U.S. PATENT DOCUMENTS

| | | | |
|---|---|---|---|
| 9,837,043 B1* | 12/2017 | Patel ...................... | G09G 5/006 |
| 2010/0079356 A1* | 4/2010 | Hoellwarth .......... | G02B 27/017 345/8 |
| 2011/0221897 A1 | 9/2011 | Haddick et al. | |
| 2015/0009416 A1* | 1/2015 | Tamayama ............. | G09G 5/005 348/746 |
| 2015/0219902 A1* | 8/2015 | Kim ................... | G02B 27/0179 345/8 |

(Continued)

FOREIGN PATENT DOCUMENTS

| CN | 104769935 A | 7/2008 |
|---|---|---|
| CN | 103946732 A | 7/2014 |

(Continued)

*Primary Examiner* — Kevin M Nguyen
(74) *Attorney, Agent, or Firm* — Leydig, Voit & Mayer, Ltd.

(57) ABSTRACT

The present invention discloses a method of adapting a virtual reality helmet, comprising: pre-writing models of a plurality of virtual reality helmets and corresponding parameters into a virtual reality helmet system; obtaining a model of a to-be-adapted virtual reality helmet; parsing out corresponding parameters from the virtual reality helmet system according to the model of the to-be-adapted virtual reality helmet; determining size and position of an imaging area on a screen of the to-be-adapted virtual reality helmet according to the parsed-out parameters. By determining size and position of the imaging area on the screen of the to-be-adapted virtual reality helmet according to the parameters pre-stored in the virtual reality helmet system, the problem of abnormal image contents viewed with various kinds of different helmets is solved.

16 Claims, 3 Drawing Sheets

(56) References Cited

U.S. PATENT DOCUMENTS

| | | | |
|---|---|---|---|
| 2015/0254905 A1* | 9/2015 | Ramsby | G06T 19/006 345/419 |
| 2015/0346494 A1* | 12/2015 | Tanaka | G02B 27/017 345/647 |
| 2016/0011422 A1* | 1/2016 | Thurber | G02B 27/64 345/8 |
| 2017/0011706 A1* | 1/2017 | Namkung | G09G 5/006 |
| 2017/0070729 A1 | 3/2017 | Li et al. | |

FOREIGN PATENT DOCUMENTS

| | | |
|---|---|---|
| CN | 104035760 A | 9/2014 |
| CN | 105192982 A | 12/2015 |

* cited by examiner

ମETHOD OF ADAPTING A VIRTUAL REALITY HELMET

CROSS-REFERENCE TO RELATED APPLICATIONS

This application claims priority to and the benefit of Chinese Patent Application No.: 201511032228.X filed Dec. 31, 2015 and titled "Method of Adapting a Virtual Reality Helmet." The contents of the above-identified Application are relied upon and incorporated herein by reference in their entirety.

FIELD OF THE INVENTION

The present invention relates to the technical field of virtual reality, and more specifically to a method of adapting a virtual reality helmet.

BACKGROUND OF THE INVENTION

With expeditious development of network and technologies, the virtual reality industry also develops rapidly. Various manufacturers have launched their own virtual reality helmets. However, different virtual reality helmets generally have different structures and use different optical lens. This causes sizes and contents of an image to be viewed different when different virtual reality helmets are worn.

For a virtual reality helmet integrally designed with an in-built screen, it is possible to adjust an imaging range and effect of the screen during a process of manufacturing the helmet. However, for a virtual reality helmet that needs a mobile phone placed inside as a screen, it is impossible for the helmet to be well adapted to the mobile phones of all models. For example, when a mobile phone with a larger size is put inside, it is quite possible that the mobile phone's screen is larger than a user's visual range; as a consequence, content viewed by the user will be incomplete. Such a problem might also arise even for a same mobile phone when being used in different virtual reality helmets. This seriously dampens user experience.

SUMMARY OF THE INVENTION

In order to solve the above problems, the present invention provides a method of adapting a virtual reality helmet, comprising:

pre-writing models of a plurality of virtual reality helmets and corresponding parameters into a virtual reality helmet system;

obtaining a model of a to-be-adapted virtual reality helmet;

parsing out corresponding parameters from the virtual reality helmet system according to the model of the to-be-adapted virtual reality helmet;

determining size and position of an imaging area on a screen of the to-be-adapted virtual reality helmet according to the parsed-out parameters.

Wherein, the to-be-adapted virtual reality helmet comprises a screen and two lenses;

corresponding parameters as parsed out from the virtual reality helmet system include: radius of the lens of the to-be-adapted virtual reality helmet, maximum field of view of the lens, screen-to-lens vertical distance, human eye-to-screen vertical distance, screen bottom-to-imaging area distance, distance between centers of the two lens, thickness of the lens, and optical lens equation.

Wherein, determining size and position of an imaging area on a screen of the to-be-adapted virtual reality helmet according to the parsed-out parameters comprises:

calculating a radius of the imaging area based on the radius of the lens of the to-be-adapted virtual reality helmet, the maximum field of view of the lens, the screen-to-lens distance, the human eye-to-screen distance, the thickness of the lens, and the optical lens equation;

calculating a horizontal position of a center of the imaging area on the screen of the to-be-adapted virtual reality helmet, according to the distance between the centers of two lens of the to-be-adapted virtual reality helmet;

calculating a vertical position of the center of the imaging area on the screen of the to-be-adapted virtual reality helmet, according to the screen bottom-to-imaging area distance of the to-be-adapted virtual reality helmet and the radius of the imaging area.

Wherein, the screen of the to-be-adapted virtual reality helmet is a screen of a mobile phone that is disposed inside of the to-be-adapted virtual reality helmet.

Wherein, the method further comprises: performing counter-distortion correction to each frame of image displayed in the imaging area of the screen of the to-be-adapted virtual reality helmet.

Wherein, the performing counter-distortion correction to each frame of image displayed in the imaging area on the screen of the to-be-adapted virtual reality helmet comprises:

dividing an image displayed in the imaging area into a plurality of blocks;

determining coordinates of each block of image with the center of the imaging area as an origin;

calculating new coordinates of the each block of image after distortion through a distortion equation of the optical lens;

rendering an image after counter-distortion correction according to the new coordinates.

Wherein, the rendering an image after counter-distortion correction according to the new coordinates specifically comprises: creating a bucket-shape model, and sticking the each block of image as a mapping to a corresponding position of the bucket-shape model according to the new coordinates of the each block of image.

The embodiments of the present invention have the following advantageous effects: by determining size and position of the imaging area on the screen of the to-be-adapted virtual reality helmet, according to parameters of the virtual reality helmet which are pre-stored in the virtual reality helmet system, all images will be displayed in the imaging area of the screen, which guarantees that the images viewed by the user are all complete, thereby solving the problem of image content abnormality when viewed with various kinds of helmets. In a preferred embodiment, by performing corresponding counter-distortion correction to an image after size and position of the imaging area are determined and then displaying the corrected image in the imaging area, the user may view an undistorted image, thereby providing a more comfortable viewing effect.

DETAILED DESCRIPTION OF THE PREFERRED EMBODIMENTS

In order to make the objectives, technical solutions, and advantages of the present invention more apparent, embodiments of the present invention will be described in further detail with reference to the accompanying drawings.

Figure 1:
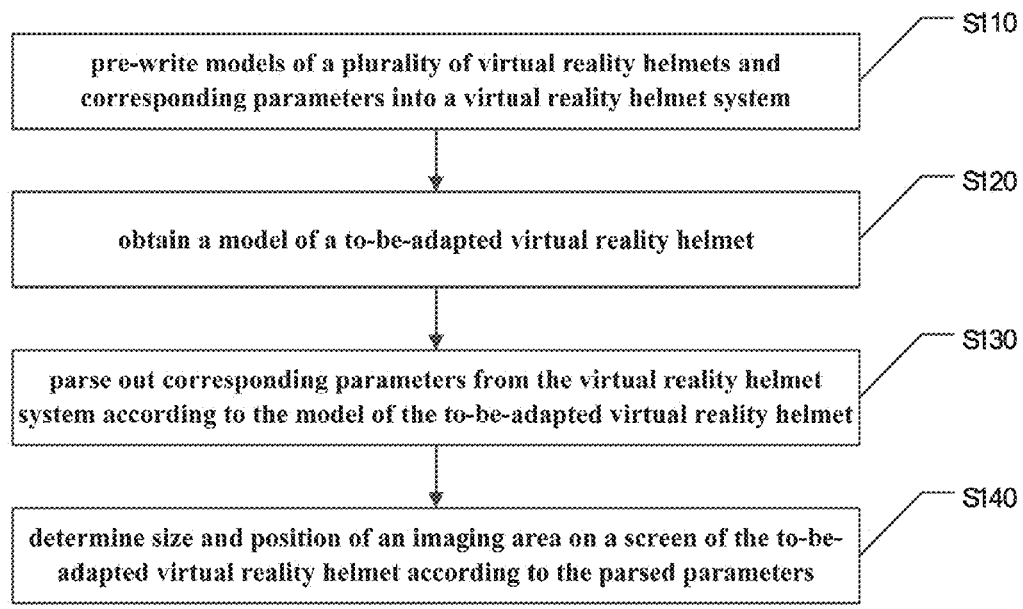
FIG. 1 shows a specific flow diagram of a method of adapting a virtual reality helmet according to an embodiment of the present invention.

FIG. 1 shows a specific flow diagram of a method of adapting a virtual reality helmet according to an embodiment of the present invention. As shown in FIG. 1, the method of adapting a virtual reality helmet according to an embodiment of the present invention comprises:

Step S110: pre-write models of a plurality of virtual reality helmets and corresponding parameters into a virtual reality helmet system. Because different virtual reality helmets have different structural designs and different optical parameters of lens, it is needed to collect the structural parameters of a to-be-adapted helmet and the parameters of optical lens. These parameters may be written, in a specific format, into a configuration file in a virtual reality helmet system, and then parsed out for use in calculating an imaging size and position of an image. Therefore, parameters of a plurality of common types of virtual helmets should be collected first, which parameters are related to the imaging process of helmets, e.g., structural parameters of the virtual reality helmets, parameters of lens in use, etc. These parameters, in correspondence with models of respective virtual reality helmets, are stored in the virtual reality helmet system. When a user wears a virtual reality helmet, the model and parameters of the virtual reality helmet will be written into the virtual reality helmet system. The model of a helmet may also be replaced by the name of the helmet or other code, as long as it is easily identifiable.

Step S120: obtain a model of a to-be-adapted virtual reality helmet. The user selects a corresponding helmet model according to the type of the virtual reality helmet worn by him/herself; a selective menu may be provided to the user, or some hardware buttons may be configured, so as to facilitate the user to select. The model of the to-be-adapted virtual reality helmet is obtained based on the user's selection.

Step S130: parse out corresponding parameters from the virtual reality helmet system according to the model of the to-be-adapted virtual reality helmet. Based on the user's selection in step S120, parameters corresponding to the model of the virtual reality helmet are parsed out from the virtual reality helmet system.

Step S140: determine size and position of an imaging area of a screen of the to-be-adapted virtual reality helmet according to the parsed-out parameters. Size of the imaging area of the to-be-adapted virtual reality helmet is determined according to the parameters parsed out in step S130, and images are displayed at a corresponding position on the screen of the to-be-adapted and worn virtual reality helmet.

By determining size and position of the imaging area on the screen of the to-be-adapted and worn virtual reality helmet according to corresponding parameters of the to-be-adapted virtual reality helmet, it may be avoided that differences in the structures of different virtual reality helmets and optical lens in use cause abnormal image effect viewed with different worn virtual reality helmets.

Figure 2:
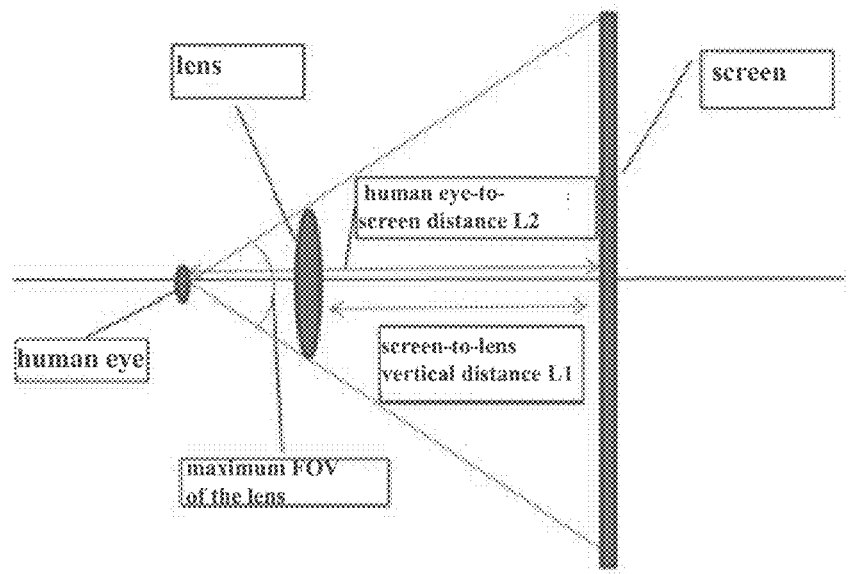
FIG. 2 shows an imaging principle diagram of a virtual reality helmet in a method of adapting a virtual reality helmet according to an embodiment of the present invention.
Figure 3:
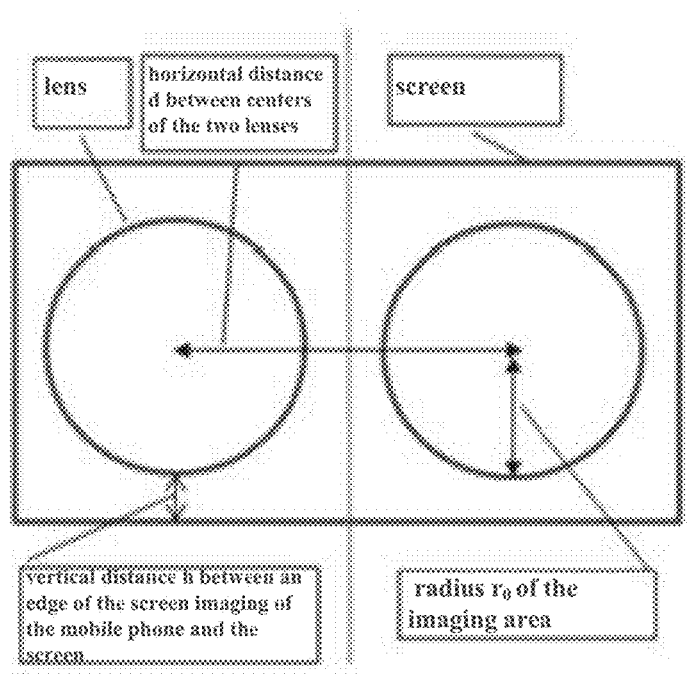
FIG. 3 shows an effect schematic diagram of an imaging area in a method of adapting a virtual reality helmet according to an embodiment of the present invention.

FIG. 2 shows an imaging principle diagram of a virtual reality helmet in a method of adapting a virtual reality helmet according to an embodiment of the present invention. FIG. 3 shows an effect schematic diagram of an imaging area in a method of adapting a virtual reality helmet according to an embodiment of the present invention. As shown in FIGS. 2 and 3, an existing virtual reality helmet generally views contents on a screen through lens disposed between human eyes and the screen. A virtual reality helmet includes one screen and two lens, such that the left and right eyes view contents of different angles, thereby rendering a 3D effect. The screen of the virtual reality helmet may be an in-built screen; or a mobile phone is placed inside the virtual reality helmet, such that the screen of the mobile phone is used as the screen of the virtual reality helmet. Hereinafter, the principle and process of determining size and position of an imaging area on the screen of the to-be-adapted virtual reality helmet will be illustrated with an example of a virtual reality helmet using a mobile phone placed inside as the screen.

The user's visual range after wearing a virtual reality helmet is fixed, e.g., through round lenses, the user's visual range is the two round areas on the screen shown in FIG. 3, located in the left side and right side of the screen, respectively, only when the images displayed on the screen of the to-be-adapted virtual reality helmet are all within these regions, can the user view complete images.

In order to determine size and position of a round area (i.e., imaging area) shown in FIG. 3, it is needed to parse out parameters from the virtual reality helmet system, such as radius r of the lens of the to-be-adapted virtual reality helmet, maximum field of view FOV of the lens, screen-to-lens vertical distance L1, human eye-to-screen vertical distance L2, screen bottom-to-imaging area distance h, distance d between centers of the two lens, thickness d1 of the lens, and optical lens equation, e.g., $r1=1+k1*r2+k2*r4+\ldots$.

When the distances from the human eyes and the lens to the screen are fixed, for a specific round lens, the radius r0 of the imaging area on the screen of the to-be-adapted virtual reality helmet may be calculated based on parameters such as the radius r of the lens, the maximum field of view FOV of the lens, the screen-to-lens vertical distance L1, the human eye-to-screen vertical distance L2, the thickness d1 of the lens, and the optical lens equation, e.g., $r1=1+k1*r2+k2*r4+\ldots$, thereby determining size of the imaging area.

The two round imaging regions in the left and right sides of the screen are symmetrical about a vertical central line of the screen. Based on the distance d between centers of two lens, a horizontal position of a round center may be determined. There may be two manners of determining a vertical position of a round center. If a device that may adjust a position of the mobile phone up and down is provided on the virtual reality helmet, the center of the lens may be aligned with a horizontal central line of the mobile phone. In this way, the vertical position of the center of an imaging area on the screen of the to-be-adapted virtual reality helmet screen is just at the horizontal central line of the mobile phone. If the virtual reality helmet does not have a device for adjusting the position of the mobile phone, i.e., the mobile phone can only be placed at the bottom of a housing, then the distance from the center of an imaging area to the screen bottom will be calculated according to the screen bottom—imaging area distance h and the radius r of the imaging area, thereby determining the vertical position of the center of the imaging area on the screen of the to-be-adapted virtual reality helmet.

In this way, whether it is the case that the same mobile phone is placed in different virtual reality helmets, or the case that the same virtual reality helmet has different mobile phones placed therein, the imaging area may be adaptively adjusted, and no abnormality will arise in the display effect.

The present embodiment has illustrated a specific process of determining size and position of an imaging area with an example of a virtual reality helmet that uses a mobile phone placed inside as a screen. Meanwhile, the method of adapting a virtual reality helmet according to the present invention may also be applied to other types of virtual reality helmets.

Figure 4:
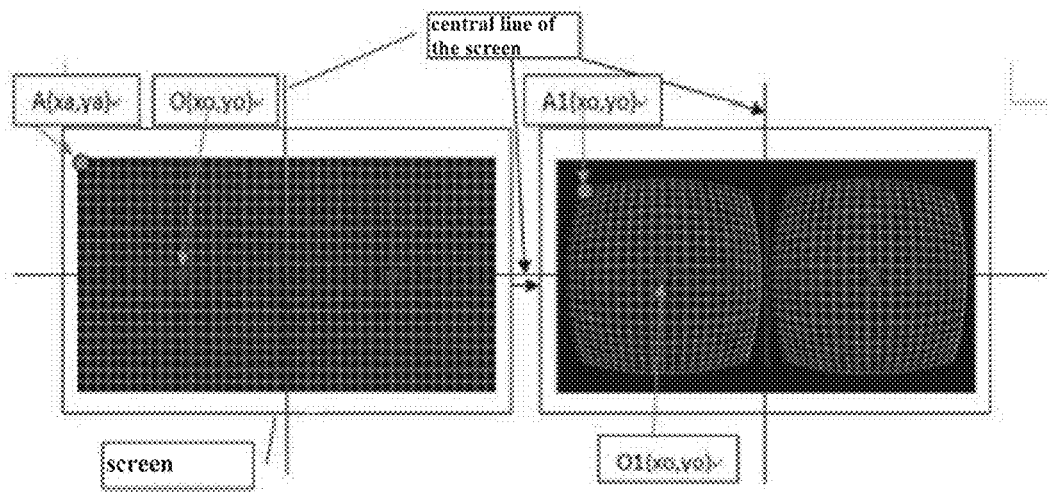
FIG. 4 shows a principle diagram of counter-distortion correction in a method of adapting a virtual reality helmet according to a preferable embodiment of the present invention.

FIG. 4 shows a principle diagram of counter-distortion correction in a method of adapting a virtual reality helmet according to an embodiment of the present invention. For a virtual reality helmet, because images on the screen are viewed through lenses, the viewed images are all pillow-shaped distorted. In order to provide a better viewing experience to the user, in one preferred embodiment of the present invention, after size and position of the imaging area are determined, the image will be counter-distortion corrected before being displayed in the imaging area.

Figure 5:
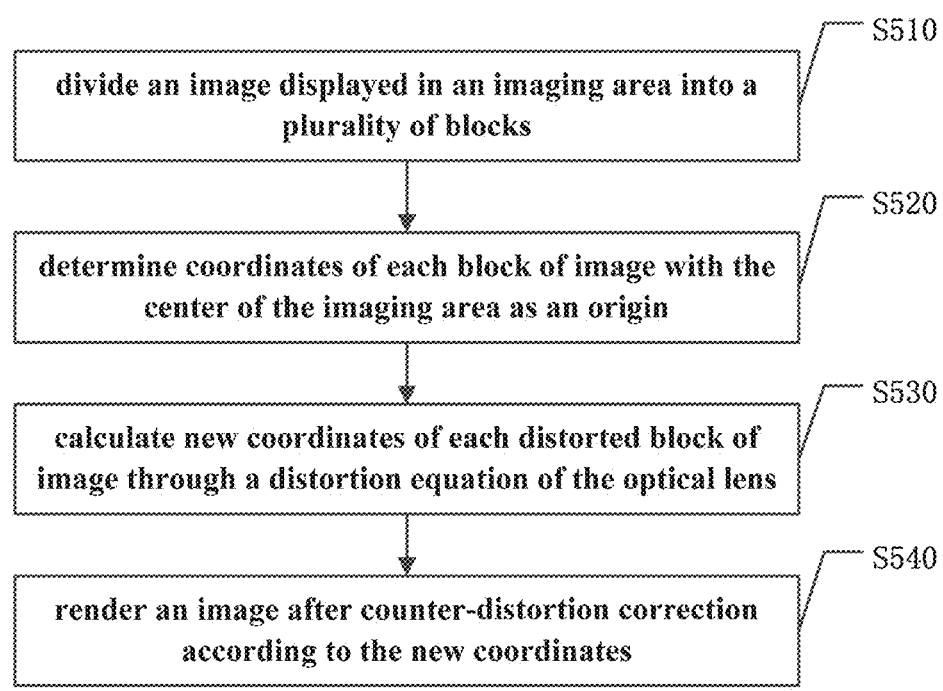
FIG. 5 shows a flow diagram of a counter-distortion correction process in a method of adapting a virtual reality helmet according to a preferable embodiment of the present invention.

As shown in FIG. 4, the left image is an image that needs to be displayed to the user, while the right image is an image actually displayed in the imaging area after counter-distortion correction. A counter-distortion correction process is shown in FIG. 5, comprising:

Step S510: first, divide an image displayed in an imaging area into a plurality of blocks. The image displayed in the imaging area is an image before counter-distortion correction, which is actually not displayed on the screen where only the counter-distortion corrected image is displayed. With the image on the left half part of the screen as an example, the image on the left half part of the screen may be divided into blocks of 40×40.

Step S520: determine a coordinate of each block of image with a center of the imaging area as an origin. The dot in the middle of the screen as shown in FIG. 4 is a central point 0 (x0, y0) of the imaging area, corresponding to the center of the lens. With the point 0 (x0, y0) as the origin, a rectangular coordinate system is established to determine coordinates of respective blocks of images in step S510. For example, the coordinate of the first block of image at the upper left corner shown in FIG. 4 is A (xa, ya).

Step S530: calculate a new coordinate of each distorted block of image through a distortion equation of the optical lens. With the point A (xa, ya) as an example, first, the point 0-point A distance Roa=sqart((xa−x0)2+(ya−yo)2) is calculated; then, the coordinate of counter-distortion corrected point A1 corresponding to point A is calculated through the distortion equation of the optical lens, specifically, by calculating the point 0-point A1 distance Roa1=1+k1*Roa2+ k2*Roa4+ . . . , (xa−x0)/(xa1−x0)=(ya−x0)=Roa/Roa1 is derived according to the principle of similar triangle, and finally, the coordinate of A1(xa1,ya1) is calculated.

Step S540: render the counter-distortion corrected image based on the new coordinates. The counter-distortion corrected image may be rendered using a technology such as OpenGL. Because the image viewed through the lenses is pillow-shape distorted, it is needed to perform bucket-shape counter-distortion correction to the original image, such that the user can view an undistorted image through the lenses.

First, a bucket-shape model is created using the new coordinate derived in step S530 and is drawn; then, each block of image in the original image is appropriately transformed and stuck to a corresponding position of the bucket-shape model based on their respective new coordinates. For example, by applying OpenGL, each frame of image is bound to a texture unit of OpenGL; the image of the texture unit is collected to be stuck to the new bucket-shape model as a mapping; finally, a bucket-shape image may be rendered.

Through counter-distortion correction, the user may view a normal image through the lenses. Besides, the process of counter-distortion correction is determined according to the parameters stored in the virtual reality helmet system and the imaging area derived from calculation. If the parameters are different or the imaging areas are different, the final images derived from counter-distortion correction would be different. In other words, according to the user's selection of the helmet model, a counter-distortion correction suitable for the helmet will be made, such that a suitable view effect may be obtained through this method even the user wears different helmets.

In view of the above, the method of adapting a virtual reality helmet according to the present invention has the following advantageous effects compared with the prior art:

1. By determining size and position of an imaging area on the screen of the to-be-adapted virtual reality helmet according to the parameters pre-stored in the virtual reality helmet system, the method of adapting the virtual reality helmet according to the present invention solves the problem of image content abnormality viewed with various kinds of helmets.

2. By performing a corresponding counter-distortion correction after determining size and position of the imaging area and then displaying the corrected image in the imaging area, the method of adapting the virtual reality helmet according to the present invention enables a user to view an undistorted image, thereby providing a more comfortable view effect.

What have been described above are only preferred embodiments of the present invention, not for limiting the protection scope of the present invention. Any modifications, equivalent substitutions and improvements made within the spirit and principle of the present invention are included within the protection scope of the present invention.

The invention claimed is:

1. A method of adapting a virtual reality helmet, the method comprising:
   pre-writing models of a plurality of virtual reality helmets and corresponding parameters into a virtual reality helmet system;
   obtaining a model of a to-be-adapted virtual reality helmet comprising a screen and two lenses;
   parsing out the corresponding parameters from the virtual reality helmet system according to the model of the to-be-adapted virtual reality helmet, wherein the corresponding parameters parsed out from the virtual reality helmet system include:
      a radius of one of the two lenses of the to-be-adapted virtual reality helmet,
      a maximum field of view of one of the two lenses,
      a screen-to-lens vertical distance,
      a human eye-to-screen vertical distance,
      a screen bottom-to-imaging area distance,
      a distance between centers of the two lenses,
      a thickness of one of the two lenses, and an optical lens equation;
determining size and position of an imaging area on a screen of the to-be-adapted virtual reality helmet according to the parsed-out parameters, including:
determining a radius of the imaging area based on the radius of the lens of the to-be-adapted virtual reality helmet, the maximum field of view of the lens, the screen-to-lens vertical distance, the human eye-to-screen vertical distance, the thickness of the lens, and the optical lens equation;
determining a horizontal position of a center of the imaging area in the screen of the to-be-adapted virtual reality helmet according to the distance between the centers of the two lenses of the to-be-adapted virtual reality helmet; and
determining a vertical position of the center of the imaging area on the screen of the to-be-adapted virtual reality helmet according to the screen bottom-to-imaging area distance of the to-be-adapted virtual reality helmet and the radius of the imaging area.

2. The method of adapting a virtual reality helmet according to claim 1, wherein the screen of the to-be-adapted virtual reality helmet is a screen of a mobile phone that is disposed inside of the to-be-adapted virtual reality helmet.

3. The method of adapting a virtual reality helmet according to claim 1, further comprising:
performing counter-distortion correction to each frame of an image displayed in the imaging area on the screen of the to-be-adapted virtual reality helmet according to the parsed-out parameters.

4. The method of adapting a virtual reality helmet according to claim 3, wherein performing the counter-distortion correction to each frame of the image displayed in the imaging area of the screen of the to-be-adapted virtual reality helmet comprises:
dividing the image displayed in the imaging area into a plurality of blocks;
determining coordinates of each block of the image with the center of the imaging area as an origin;
determining new coordinates of each distorted block of image through a distortion characteristic of an optical lens corresponding to the optical lens equation; and
rendering a counter-distortion corrected image according to the new coordinates.

5. The method of adapting a virtual reality helmet according to claim 4, wherein rendering the counter-distortion corrected image according to the new coordinates comprises:
creating a model; and
mapping each of the blocks of the image to a corresponding position of the model according to the new coordinates of each of the blocks of the image.

6. The method of adapting a virtual reality helmet according to claim 5, wherein the model is a bucket-shaped model.

7. A method of adapting a virtual reality helmet, the method comprising:
parsing out corresponding parameters from a virtual reality helmet system according to a model of a to-be-adapted virtual reality helmet comprising a screen and two lenses, wherein the corresponding parameters parsed out from the virtual reality helmet system include:
a radius of one of the two lenses of the to-be-adapted virtual reality helmet,
a maximum field of view of one of the two lenses,
a screen-to-lens vertical distance,
a human eye-to-screen vertical distance,
a screen bottom-to-imaging area distance,
a distance between centers of the two lenses,
a thickness of one of the two lenses, and
an optical lens equation;
determining size and position of an imaging area on a screen of the to-be-adapted virtual reality helmet according to the parsed-out parameters, including:
determining a radius of the imaging area based on the radius of the lens of the to-be-adapted virtual reality helmet, the maximum field of view of the lens, the screen-to-lens vertical distance, the human eye-to-screen vertical distance, the thickness of the lens, and the optical lens equation;
determining a horizontal position of a center of the imaging area in the screen of the to-be-adapted virtual reality helmet according to the distance between the centers of the two lenses of the to-be-adapted virtual reality helmet; and
determining a vertical position of the center of the imaging area on the screen of the to-be-adapted virtual reality helmet according to the screen bottom-to-imaging area distance of the to-be-adapted virtual reality helmet and the radius of the imaging area.

8. The method of adapting a virtual reality helmet according to claim 7, further comprising:
performing counter-distortion correction to each frame of an image displayed in the imaging area on the screen of the to-be-adapted virtual reality helmet according to the parsed-out parameters.

9. The method of adapting a virtual reality helmet according to claim 8, wherein performing the counter-distortion correction to each frame of the image displayed in the imaging area of the screen of the to-be-adapted virtual reality helmet comprises:
dividing the image displayed in the imaging area into a plurality of blocks;
determining coordinates of each block of the image with the center of the imaging area as an origin;
determining new coordinates of each distorted block of image through a distortion characteristic of an optical lens corresponding to the optical lens equation; and
rendering a counter-distortion corrected image according to the new coordinates.

10. The method of adapting a virtual reality helmet according to claim 9, wherein rendering the counter-distortion corrected image according to the new coordinates comprises:
creating a model; and
mapping each of the blocks of the image to a corresponding position of the model according to the new coordinates of each of the blocks of the image.

11. The method of adapting a virtual reality helmet according to claim 10, wherein the model is a bucket-shaped model.

12. A method of adapting a virtual reality helmet, the method comprising:
pre-writing models of a plurality of virtual reality helmets and corresponding parameters into a virtual reality helmet system;
obtaining a model of a to-be-adapted virtual reality helmet comprising a screen and two lenses;
parsing out the corresponding parameters from the virtual reality helmet system according to the model of the to-be-adapted virtual reality helmet, wherein the corresponding parameters parsed out from the virtual reality helmet system include:

a radius of one of the two lenses of the to-be-adapted virtual reality helmet,
a maximum field of view of one of the two lenses,
a screen-to-lens vertical distance,
a human eye-to-screen vertical distance,
a screen bottom-to-imaging area distance,
a distance between centers of the two lenses,
a thickness of one of the two lenses, and
an optical lens equation;
determining size and position of an imaging area on a screen of the to-be-adapted virtual reality helmet according to the parsed-out parameters, including:
determining a radius of the imaging area based on the radius of the lens of the to-be-adapted virtual reality helmet, the maximum field of view of the lens, the screen-to-lens vertical distance, the human eye-to-screen vertical distance, the thickness of the lens, and the optical lens equation;
determining a horizontal position of a center of the imaging area in the screen of the to-be-adapted virtual reality helmet according to the distance between the centers of the two lenses of the to-be-adapted virtual reality helmet; and
determining a vertical position of the center of the imaging area on the screen of the to-be-adapted virtual reality helmet according to the screen bottom-to-imaging area distance of the to-be-adapted virtual reality helmet and the radius of the imaging area; and
wherein the screen of the to-be-adapted virtual reality helmet is a screen of a mobile phone that is disposed inside of the to-be-adapted virtual reality helmet.

13. The method of adapting a virtual reality helmet according to claim 12, further comprising:
performing counter-distortion correction to each frame of an image displayed in the imaging area on the screen of the to-be-adapted virtual reality helmet according to the parsed-out parameters.

14. The method of adapting a virtual reality helmet according to claim 13, wherein performing the counter-distortion correction to each frame of the image displayed in the imaging area of the screen of the to-be-adapted virtual reality helmet comprises:
dividing the image displayed in the imaging area into a plurality of blocks;
determining coordinates of each block of the image with the center of the imaging area as an origin;
determining new coordinates of each distorted block of image through a distortion characteristic of an optical lens corresponding to the optical lens equation; and
rendering a counter-distortion corrected image according to the new coordinates.

15. The method of adapting a virtual reality helmet according to claim 14, wherein rendering the counter-distortion corrected image according to the new coordinates comprises:
creating a model; and
mapping each of the blocks of the image to a corresponding position of the model according to the new coordinates of each of the blocks of the image.

16. The method of adapting a virtual reality helmet according to claim 15, wherein the model is a bucket-shaped model.

* * * * *